United States Patent
Goel (10) Patent No.: US 8,836,700 B2
(45) Date of Patent: Sep. 16, 2014

(54) SYSTEM, METHOD, AND COMPUTER PROGRAM PRODUCT FOR A TESSELLATION ENGINE USING A GEOMETRY SHADER

(75) Inventor: Vineet Goel, Winter Park, FL (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 942 days.

(21) Appl. No.: 12/472,709

(22) Filed: May 27, 2009

(65) Prior Publication Data

US 2009/0295798 A1  Dec. 3, 2009

Related U.S. Application Data

(60) Provisional application No. 61/056,936, filed on May 29, 2008.

(51) Int. Cl.
| | | |
|---|---|---|
| G06T 15/30 | (2011.01) | |
| G06F 15/16 | (2006.01) | |
| G06F 12/02 | (2006.01) | |
| G06T 17/00 | (2006.01) | |
| G06T 15/00 | (2011.01) | |
| G06T 17/20 | (2006.01) | |

(52) U.S. Cl.
CPC ............... *G06T 15/005* (2013.01); *G06T 17/20* (2013.01)
USPC ............ 345/423; 345/502; 345/543; 345/420

(58) Field of Classification Search
CPC ....................................................... G06T 1/20
See application file for complete search history.

(56) References Cited

U.S. PATENT DOCUMENTS

| 5,261,029 A * | 11/1993 | Abi-Ezzi et al. ............... 345/423 |
| 6,597,356 B1 * | 7/2003 | Moreton et al. ............... 345/423 |
| 2003/0169269 A1 | 9/2003 | Sasaki et al. |
| 2005/0243094 A1 | 11/2005 | Patel et al. |

(Continued)

FOREIGN PATENT DOCUMENTS

| JP | 2001-204957 A | 7/2001 |
| JP | 2001-250128 A | 9/2001 |

(Continued)

OTHER PUBLICATIONS

Cook R. L., Carpenter L., Catmull E.: The Reyes Image Rendering Architecture. In Computer Graphics (Proceedings of ACM SIGGRAPH 87) (1987), pp. 96-102.*

(Continued)

*Primary Examiner* — Kee M Tung
*Assistant Examiner* — Zhengxi Liu
(74) *Attorney, Agent, or Firm* — Sterne, Kessler, Goldstein & Fox P.L.L.C.

(57) ABSTRACT

A method, system, and computer program product are disclosed for providing tessellated primitive data to a geometry shader. The method comprises computing a set of tessellated vertices and a computed set of connectivity data based on an original set of vertices and an original set of connectivity data, generating computed vertex data based on the original set of vertices and the set of tessellated vertices, receiving the computed set of connectivity data, requesting a subset of the computed vertex data based on the computed set of connectivity data, and processing primitives defined by the subset of the computed vertex data. The system and computer program product are further disclosed for accomplishing a similar result as the aforementioned method.

21 Claims, 7 Drawing Sheets

(56) References Cited

U.S. PATENT DOCUMENTS

| | | |
|---|---|---|
| 2006/0050072 A1 | 3/2006 | Goel |
| 2006/0164414 A1 | 7/2006 | Farinelli |
| 2008/0001952 A1* | 1/2008 | Srinivasan et al. ............ 345/502 |
| 2008/0055321 A1* | 3/2008 | Koduri .......................... 345/505 |
| 2009/0237401 A1* | 9/2009 | Wei et al. ...................... 345/423 |

FOREIGN PATENT DOCUMENTS

| | | |
|---|---|---|
| JP | 2005-322224 A | 11/2005 |
| JP | 2007-179563 A | 7/2007 |
| WO | WO 02/43011 A1 | 5/2002 |
| WO | WO 2008/053597 A1 | 5/2008 |

OTHER PUBLICATIONS

Tatarinov, A. (Feb. 2008). Instanced tessellation in DirectX10. In GDC '08: Game Developers' Conference 2008.*

Tatarchuk, N. (2007). Real-time tessellation on GPU. In Course 28: Advanced Real-Time Rendering in 3D Graphics and Games. ACM SIGGRAPH 2007.*

Maxim Kazakov. 2007. Catmull-Clark subdivision for geometry shaders. In Proceedings of the 5th international conference on Computer graphics, virtual reality, visualisation and interaction in Africa (AFRIGRAPH '07), Stephen N. Spencer (Ed.). ACM, New York, NY, USA, 77-84.*

"GLSL Geometry Shaders" http://web.engr.oregonstate.edu/~mjb/glman/ClassNotes/geometry_shader.pdf Class Note created on Jan. 15, 2007. Retrieved on Sep. 7, 2013.*

"GLSL Core Tutorial—Vertex Shader" http://www.lighthouse3d.com/tutorials/glsl-core-tutorial/vertex-shader/ Retrieved on Sep. 7, 2013.*

Boubekeur, T., et al., "QAS: Real-Time Quadratic Approximation of Subdivision Surfaces," Computer Graphics and Applications, 2007. PG '07. 15th Pacific Conference on , vol., No., pp. 453-456, Oct. 29, 2007-Nov. 2, 2007.

Lorenz, H. and Döllner, J., "Dynamic Mesh 1-2 Refinement on GPU Using Geometry Shaders," Feb. 2008, pp. 1-8, XP002690083, Retrieved from the Internet: URL:http://iason.fav.zcu.czjwscg2008/Papers 2008/full/C97-full.pdf [retrieved on Jan. 10, 2013].

Extended European Search Report for EP Application No. EP 09 75 5252, European Patent Office, Berlin, Germany, mailed on Jan. 23, 2013.

International Search Report for PCT application No. PCT/US09/03215, completed Jul. 1, 2009, 11pgs.

First Office Action, dated May 10, 2012, for Chinese Patent Appl. 200980119831.8, 9 pages including English translation.

Second Office Action, dated Dec. 11, 2012, for Chinese Patent Appl. 200980119831.8, 8 pages including English translation.

Supplementary European Search Report, dated Jan. 23, 2013, for European Patent Appl. No. 09755252.5, 7 pages.

Yokomizo Kenji, "Chapter 1 Experience LSI Designing Using HDL (Hardware Description Language)", pp. 24 to 38, Issue 4, vol. 10, Apr. 1, 2005, Japan, CQ Publishing Co., Ltd., Design Wave Magazine.

Office Action dispatched Aug. 21, 2013, in Japanese Patent Application No. 2011-511626, Mr. Hayakawa Yuji et al., drafted Aug. 15, 2013 with English language translation.

English language abstract of Japanese Patent No. JP 2001-204957 A European Patent Office, espacenet database—Worldwide.

English language abstract of Japanese Patent No. JP 2001-250128 A European Patent Office, espacenet database—Worldwide.

English language abstract of International Patent Publication No. WO 2008/053597 A1 European Patent Office, espacenet database—Worldwide.

* cited by examiner

SYSTEM, METHOD, AND COMPUTER PROGRAM PRODUCT FOR A TESSELLATION ENGINE USING A GEOMETRY SHADER

CROSS-REFERENCE TO RELATED APPLICATIONS

The present application claims the benefit of U.S. Provisional Application No. 61/056,936, filed on May 29, 2008, titled "System, Method, and Computer Program Product for a Tessellation Engine Using a Geometry Shader", which is incorporated herein by reference in its entirety.

BACKGROUND

1. Field of the Invention

The present invention relates generally to optimizing tessellation operations in a graphics processing unit.

2. Background

A graphics processing unit (GPU) is a special-purpose integrated circuit optimized for graphics processing operations. A GPU is often incorporated into computing devices (e.g., personal computers, rendering farms or servers, hand-held devices, digital televisions, etc.) used for executing applications with demanding graphics processing needs, such as, for example, video game applications.

In most modern GPU implementations, the processing of graphics operations is broken into various functional units, each located within a different stage of a processing pipeline. Typically, input to the GPU is in the form of a set of vertices as well as some connectivity information identifying how the vertices are connected to each other. A set of vertices coupled with connectivity information for that set of vertices defines a geometric primitive. Often, the geometric primitive of choice is a triangle, which is defined by three vertices and three edges, the edges represented as connectivity information.

As each geometric primitive is processed by the GPU for rendering, individual vertices are processed by a vertex shader. The vertex shader is generally used to perform operations that apply to individual vertices. Examples of these operations include transform operations and lighting operations. As a result of these operations, data regarding a computed vertex position, the color of the primitive at that vertex, and texture coordinates at that vertex for texture mapping are generally computed.

After computations involving individual vertices are performed, an additional stage of the pipeline may perform operations on primitives as a whole. This stage, commonly referred to as the geometry shader, can apply graphics techniques to an entire primitive, potentially resulting in the creation of additional primitives. For example, a geometry shader can be used to apply a displacement map, for repositioning the vertices, or for applying fur and fin techniques.

Upon completion of the geometry shader stage, the output is commonly sent to a rasterizer for conversion into a two-dimensional image, and further enhancements can be performed by a pixel shader.

The techniques performed by the geometry shader typically result in the creation of additional primitives for the purpose of enhancing the appearance of a rendered object. By applying a displacement map, for example, additional primitives are generated in order to provide additional vertices, which are then displaced according to a texture bitmap. Generally, as more primitives are used in the computation of the technique, the smoother and more realistic the final object will appear. However, providing too many vertices can overwhelm the vertex and geometry shaders, and may not result in a noticeably improved rendering of the object, particularly when the object being rendered is located at a significant distance from the viewing plane.

Prior implementations have relied on using a tessellation engine to increase the number of primitives immediately prior to the vertex shader stage. For example, commonly-owned U.S. Patent Application Publication No. 2004/0085312 to Buchner et al. (application Ser. No. 10/287,143), which is herein incorporated by reference in its entirety, discloses a method and apparatus for performing such tessellation. However, previous implementations have simply allowed for output from the tessellation engine to be processed by the vertex shader, then transmitted to the rasterizer for rendering to the display. If a developer using a prior implementation wanted to increase the primitive count by tessellating the primitives, then running the tessellated primitives through the geometry shader, it was necessary to store the tessellated output somewhere in memory. The developer would then need to re-run the GPU pipeline on the tessellated data in order to allow the geometry shader to perform its computations on the tessellated data.

Accordingly, what are needed are improved techniques to reduce the rendering costs attributed to tessellation when further processing tessellated data in a geometry shader.

SUMMARY

Embodiments of the invention include a method for providing tessellated primitive data to a geometry shader. The method comprises computing a set of tessellated vertices and a computed set of connectivity data at a tessellation engine based on an original set of vertices and an original set of connectivity data, generating computed vertex data at a vertex shader based on the original set of vertices and the set of tessellated vertices, receiving the computed set of connectivity data at the geometry shader, requesting, at the geometry shader, a subset of the computed vertex data based on the computed set of connectivity data, and processing primitives defined by the subset of the computed vertex data.

Embodiments of the invention additionally include a graphics processing unit for providing tessellated primitive data to a geometry shader. The graphics processing unit comprises a tessellation engine for computing a set of tessellated vertices and a computed set of connectivity data based on an original set of vertices and an original set of connectivity data, a vertex shader for generating computed vertex data based on the original set of vertices and the set of tessellated vertices, and the geometry shader for receiving the computed set of connectivity data, requesting a subset of the computed vertex data based on the computed set of connectivity data, and processing primitives defined by the subset of the computed vertex data.

Embodiments of the invention further include a computer program product comprising a computer-usable medium having computer program logic recorded thereon for enabling a processor to provide tessellated primitive data to a geometry shader. The computer program logic comprises instructions and/or data enabling the processor to: compute a set of tessellated vertices and a computed set of connectivity data at a tessellation engine based on an original set of vertices and an original set of connectivity data, generate computed vertex data at a vertex shader based on the original set of vertices and the set of tessellated vertices, receive the computed set of connectivity data at the geometry shader, request, at the geometry shader, a subset of the computed vertex data based on the computed set of connectivity data, and process primitives defined by the subset of the computed vertex data.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

DETAILED DESCRIPTION

Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein. Additionally, and as will be apparent to one of ordinary skill in the art, the simulation, synthesis and/or manufacture of the various embodiments of this invention may be accomplished, in part, through the use of computer readable code (as noted above), including general programming languages (such as C or C++), hardware description languages (HDL) including Verilog HDL, VHDL, Altera HDL (AHDL) and so on, or other available programming and/or schematic capture tools (such as circuit capture tools). This computer readable code can be disposed in any known computer usable medium including semiconductor, magnetic disk, optical disk (such as CD-ROM, DVD-ROM) and as a computer data signal embodied in a computer usable (e.g., readable) transmission medium (such as a carrier wave or any other medium including digital, optical, or analog-based medium). As such, the code can be transmitted over communication networks including the Internet and Internets. It is understood that the functions accomplished and/or structure provided by the systems and techniques described above can be represented in a core (such as a GPU core) that is embodied in program code and may be transformed to hardware as part of the production of integrated circuits.

Figure 1:
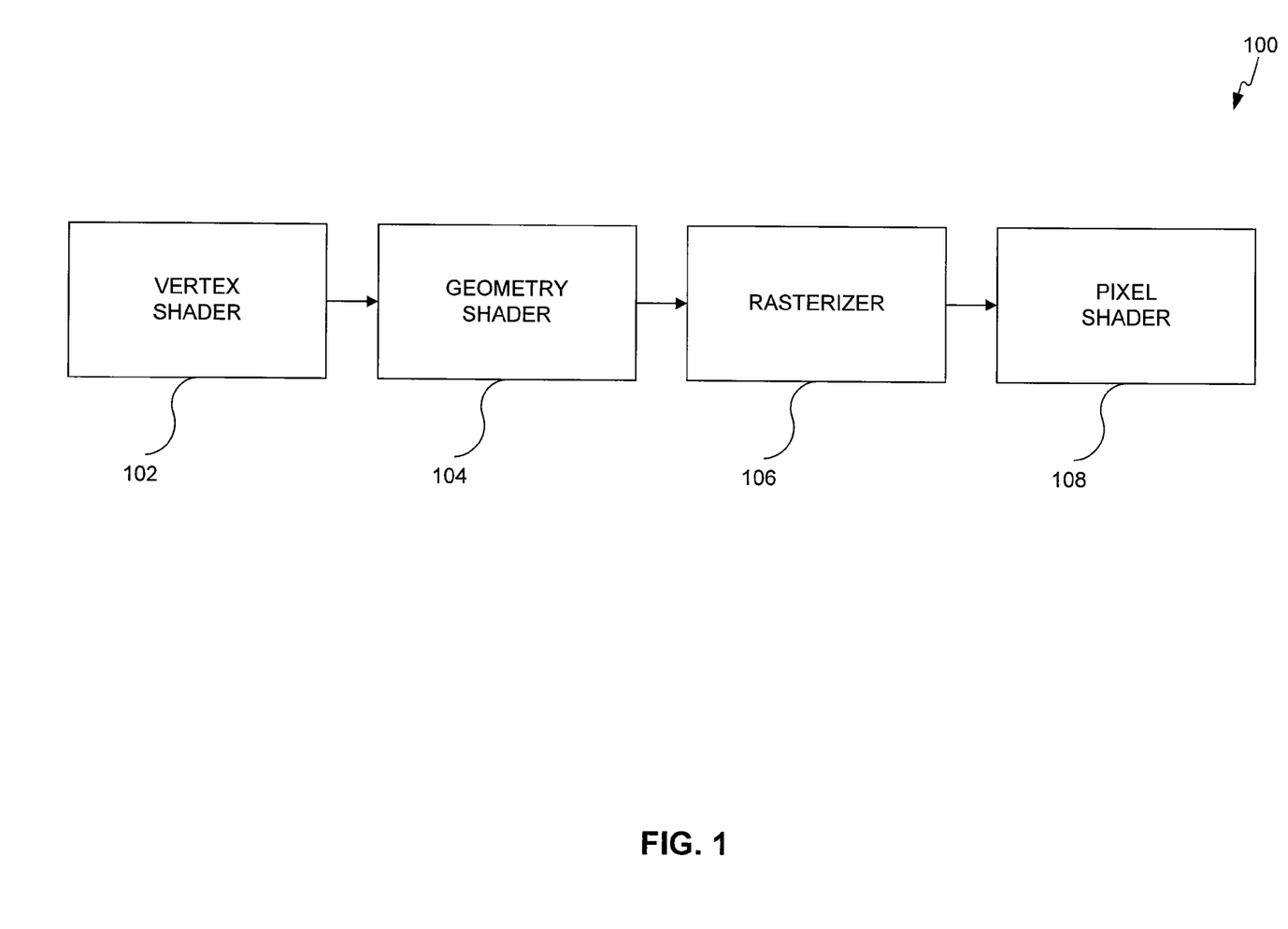
FIG. 1 is an illustration of a typical GPU pipeline implementation, in accordance with an embodiment of the present invention.

FIG. 1 illustrates a typical graphics processing unit (GPU) pipeline 100 having at least four processing stages. A modem GPU pipeline 100 often has a vertex shader 102 stage, a geometry shader 104 stage, a rasterizer 106 stage, and a pixel shader 108 stage.

In a typical use of GPU pipeline 100, a graphics application provides vertex shader 102 with a set of vertices and a set of connectivity data. Together, this set of vertices and the set of connectivity data define an object or a scene to be rendered.

The vertex shader 102 is operable to manipulate the set of vertices to perform per-vertex operations. These operations include, for example, transform operations and lighting operations. The vertex shader allows a graphics application to manipulate an object to be rendered by, for example, moving the object within a scene by adding an offset to each of the vertices that comprise the object. As an example, if a graphics application wanted to move an object to be rendered by five units along the x-axis in x,y,z-space, the vertex shader would be useful in computing a +5 offset to the x-coordinate of each vertex comprising the object, resulting in the movement of the entire object to the new offset location. In accordance with an embodiment of the present invention, such computations are accomplished by issuing a single-instruction multiple-data ("SIMD") instruction to the GPU pipeline 100.

Geometry shader 104 obtains the manipulated vertex set and the set of connectivity data from the vertex shader in preparation for further manipulation. The geometry shader 104 is configured to operate on simple geometric shapes known as primitives. While primitives may be any set of vertex data and the connectivity data between the vertices in that set, most geometry shader 104 implementations operate primarily on triangles. Triangles are defined by three vertices and the connectivity data between those three vertices. The geometry shader 104 can be used, for example, to apply a displacement map, for repositioning the vertices in a set of primitives, or for applying fur and fin techniques to a set of primitives.

The result of the geometry shader 104 applying the aforementioned techniques may be the creation of additional vertices and connectivity data, therefore forming additional primitives. For example, the application of a displacement map may result in the generation of additional vertices, and corresponding connectivity data, in order to displace areas of an object where vertices may not have previously been located.

The techniques applied at the vertex shader 102 and geometry shader 104 tend to benefit from higher primitive counts as an input to the geometry shader 104, resulting in smoother, more complex objects. Accordingly, it is beneficial to use high-order surfaces as inputs to the GPU pipeline 100 in order to obtain better results from the application of the primitive-manipulation techniques at the vertex shader 102 and geometry shader 104.

Rasterizer 106 takes the final vertex set and connectivity data set and, based on a viewing plane, determines what a scene comprising the vertex set and connectivity data set would look like if rendered in two dimensions from the corresponding point of view. This rendered scene, typically comprising a set of picture elements ("pixels") ready for display on a two-dimensional display device, is then sent to pixel shader 108 for additional processing on a per-pixel level.

As previously noted, it is generally beneficial when performing processing of primitives within GPU pipeline 100 to have additional primitives to work with, for the purposes of image quality.

Figure 2:
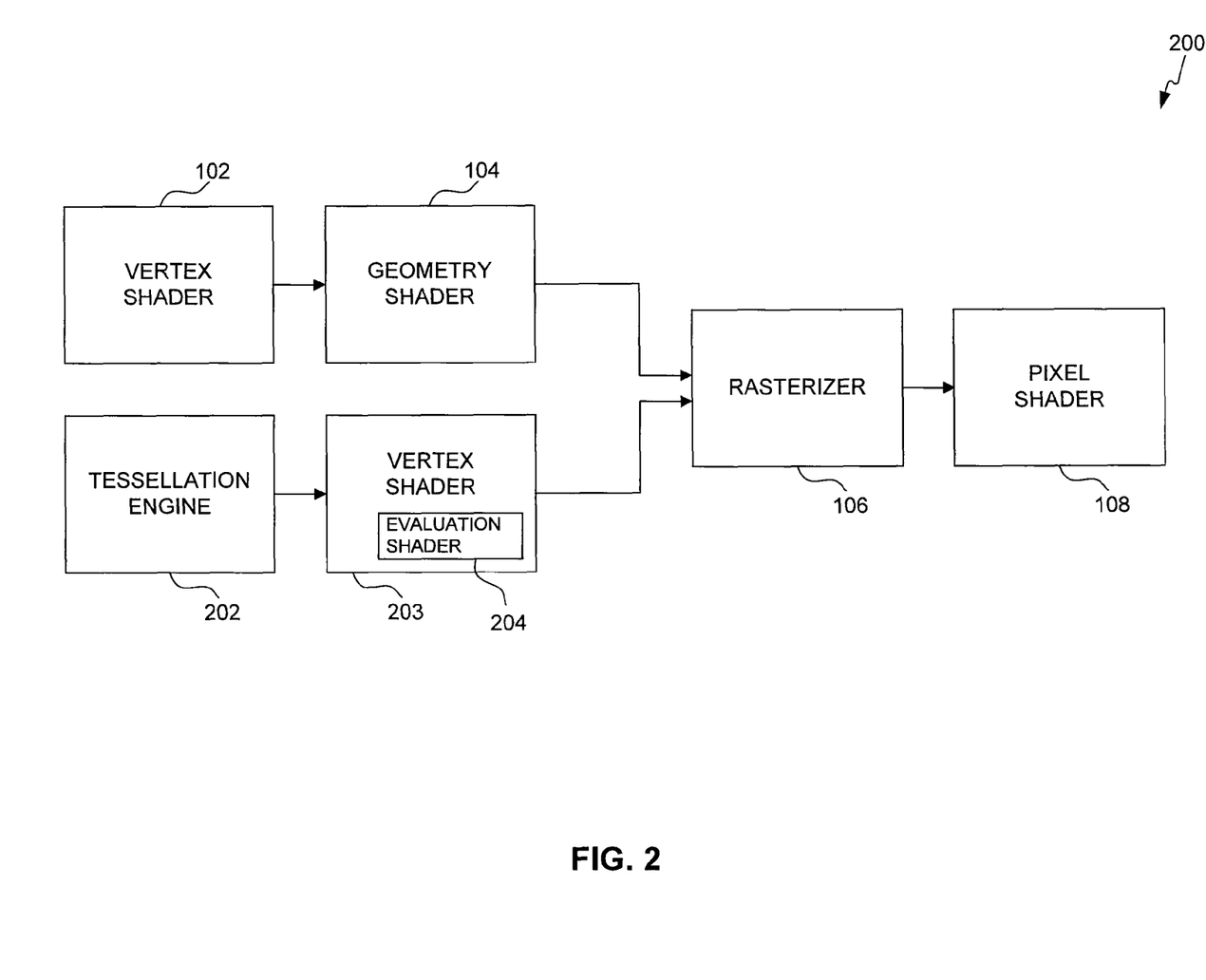
FIG. 2 is an illustration of a typical GPU pipeline implementation incorporating a tessellation engine, in accordance with an embodiment of the present invention.

FIG. 2 is a block diagram illustration of a GPU pipeline 200. The GPU pipeline 200 includes a vertex shader 203, geometry shader 104, rasterizer 106, and pixel shader 108 as in GPU pipeline 100. The GPU pipeline also includes a tessellation engine 202 for accomplishing the process of introducing additional primitives based on existing primitives, a process known as "tessellation."

Tessellation engine 202 is operable to take a vertex data set and connectivity data set and tessellate the resulting primitives, providing a new vertex data set and new connectivity data to vertex shader 203 for further processing. Commonly-owned U.S. Patent Application Publication No. 2004/0085312 to Buchner et al. (application Ser. No. 10/287,143), which is herein incorporated by reference in its entirety, discloses a method and apparatus for performing such tessellation. The output of tessellation engine 202 is then sent to the vertex shader 203 as in the traditional pathway, allowing the vertex shader 203 to compute a new set of vertices and store them within an evaluation shader 204. Rasterizer 106 could subsequently retrieve the vertices from evaluation shader 204 and continue operations as before.

In this implementation it is not possible to perform geometry shader operations on a tessellated output within the pipeline 200, as there is no means by which the tessellated output could be retrieved by the geometry shader 104. Accordingly, in order to apply the geometry shader 104 techniques to tessellated data, it would be necessary to store the tessellated data somewhere in memory and restart the pipeline 200 using the tessellated data as an input to vertex shader 203 to pass the data to geometry shader 104.

Optimized GPU Pipeline with Tessellation

Figure 3:
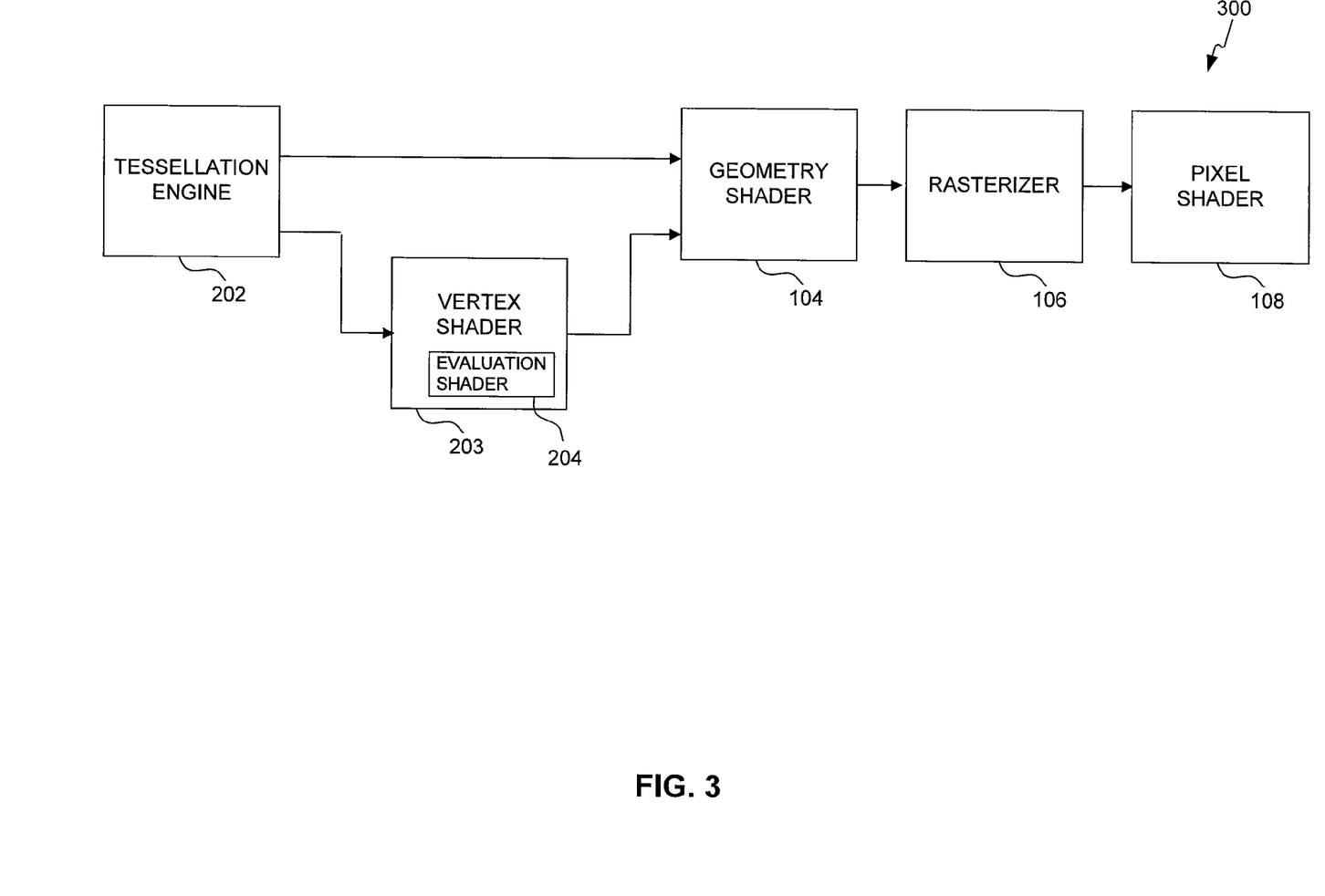
FIG. 3 is an illustration of an optimized GPU pipeline implementation incorporating a tessellation engine within the pipeline, in accordance with an embodiment of the present invention.

FIG. 3 is illustration of an optimized GPU pipeline 300, in accordance with an embodiment of the present invention. Pipeline 300 includes tessellation engine 202, vertex shader 102, evaluation shader 204, geometry shader 104, rasterizer 106, and pixel shader 108.

Tessellation engine 202 is operable to retrieve (or receive) a set of vertices and a set of connectivity information from a memory location (not shown), in accordance with an embodiment of the present invention. Applying a tessellation technique, such as the one described in commonly-owned U.S. Patent Application Publication No. 2004/0085312 to Buchner et al. (application Ser. No. 10/287,143), which is herein incorporated by reference in its entirety, allows the tessellation engine to generate tessellated primitives, in accordance with an embodiment of the present invention.

In accordance with an additional embodiment of the present invention, application of the tessellation technique at the tessellation engine 202 results in the output of the original vertices for the original input primitives as well as tessellated vertices. New connectivity information is generated by the tessellation engine corresponding to the original vertices and the tessellated vertices. The tessellated vertices are output, in the exemplary embodiment, as barycentric coordinates.

As shown in FIG. 3, the output from tessellation engine 202 is transmitted to both geometry shader 104 and vertex shader 203. In accordance with an embodiment of the present invention, tessellation engine 202 transmits the computed vertex set, comprising original vertices as well as tessellated vertices, to vertex shader 203. Vertex shader 203 is operable to compute vertex values for the computed vertex set, in accordance with an embodiment of the present invention. In accordance with an additional embodiment of the present invention, vertex shader 203 is operable to perform additional vertex operations on the vertices of the computed vertex set such as, for example, a transformation operation. One skilled in the relevant arts will appreciate that the functionality of the vertex shader includes well-known techniques for vertex-level manipulation. When all changes on the computed vertex set are performed, the computed vertex set is written to evaluation shader 204. In accordance with an embodiment of the present invention, evaluation shader 204 comprises a ring buffer to which the computed vertex set is written.

Tessellation engine 202 further transmits the connectivity data of all vertices, both original and tessellated, directly to geometry shader 104. Geometry shader 104 is then operable to use this connectivity data to obtain the vertices corresponding to a primitive defined by a subset of the connectivity data, in accordance with an embodiment of the present invention. Geometry shader 104 retrieves the vertex data from evaluation shader 204, where it has been stored by vertex shader 102, in accordance with an embodiment of the present invention.

Figure 4:
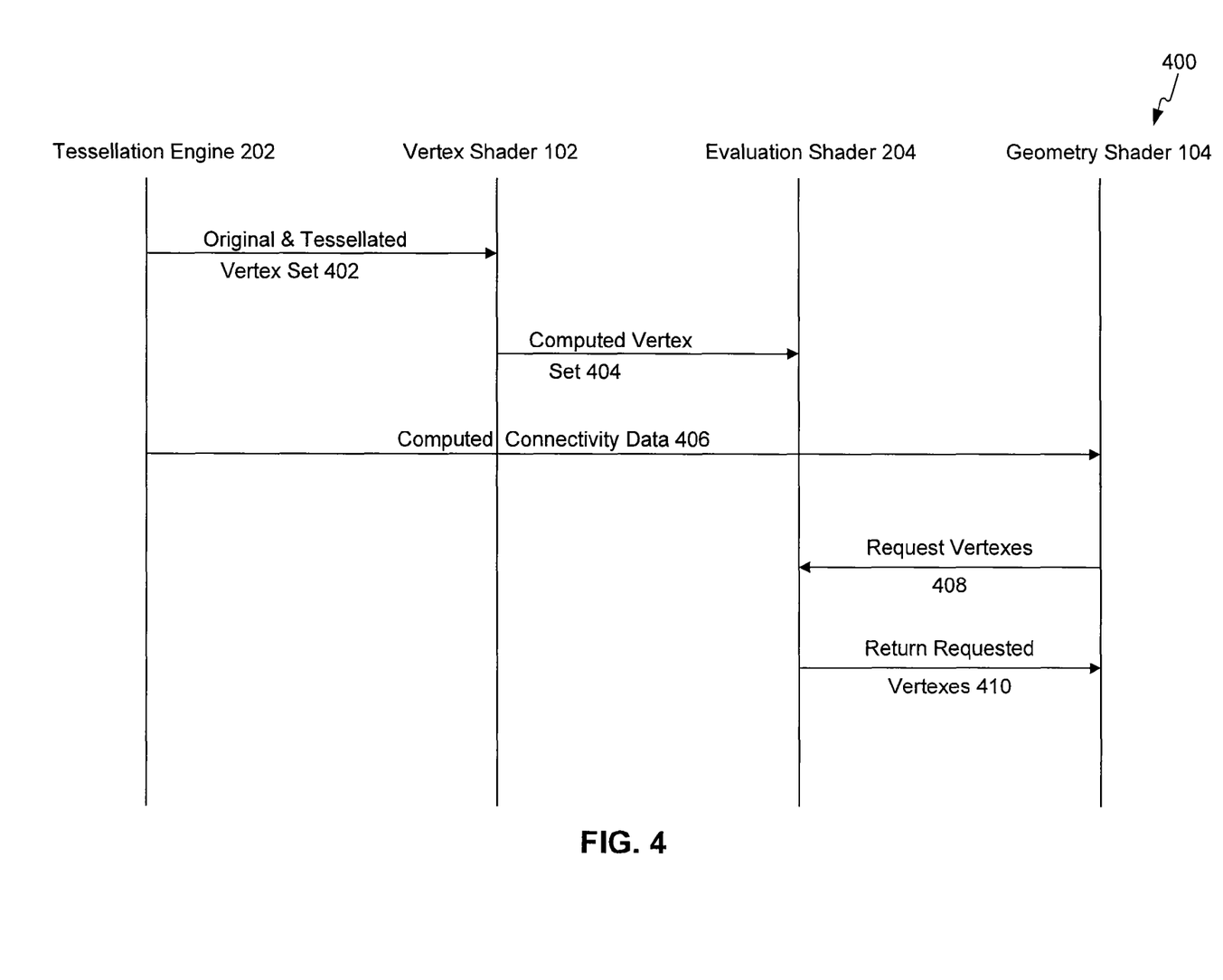
FIG. 4 is an illustration of the communications between stages of a GPU pipeline implementation, in accordance with an embodiment of the present invention.

Communication flow diagram 400 of FIG. 4 further illustrates this process in accordance with an embodiment of the present invention. Flow diagram 400 shows the communications between tessellation engine 202, vertex shader 203, evaluation shader 204, and geometry shader 104. After performing tessellation, tessellation engine 202 transmits the original and tessellated vertex set to vertex shader 203 at step 402. Upon computing the computed vertex set, vertex shader 203 stores the computed vertex set at evaluation shader 204 at step 404. Furthermore, tessellation engine 202 transmits the computed connectivity data for all vertices directly to geometry shader 104 at step 406.

With the connectivity data in hand, geometry shader 104 then requests the set of vertices corresponding to a primitive defined by the connectivity data at step 408, in accordance with an embodiment of the present invention. Evaluation shader 204 then provides the requested vertices at step 410. Geometry shader 104 is then operable to perform primitive-level operations on the vertices returned at step 410.

Method of Operation

Figure 5:
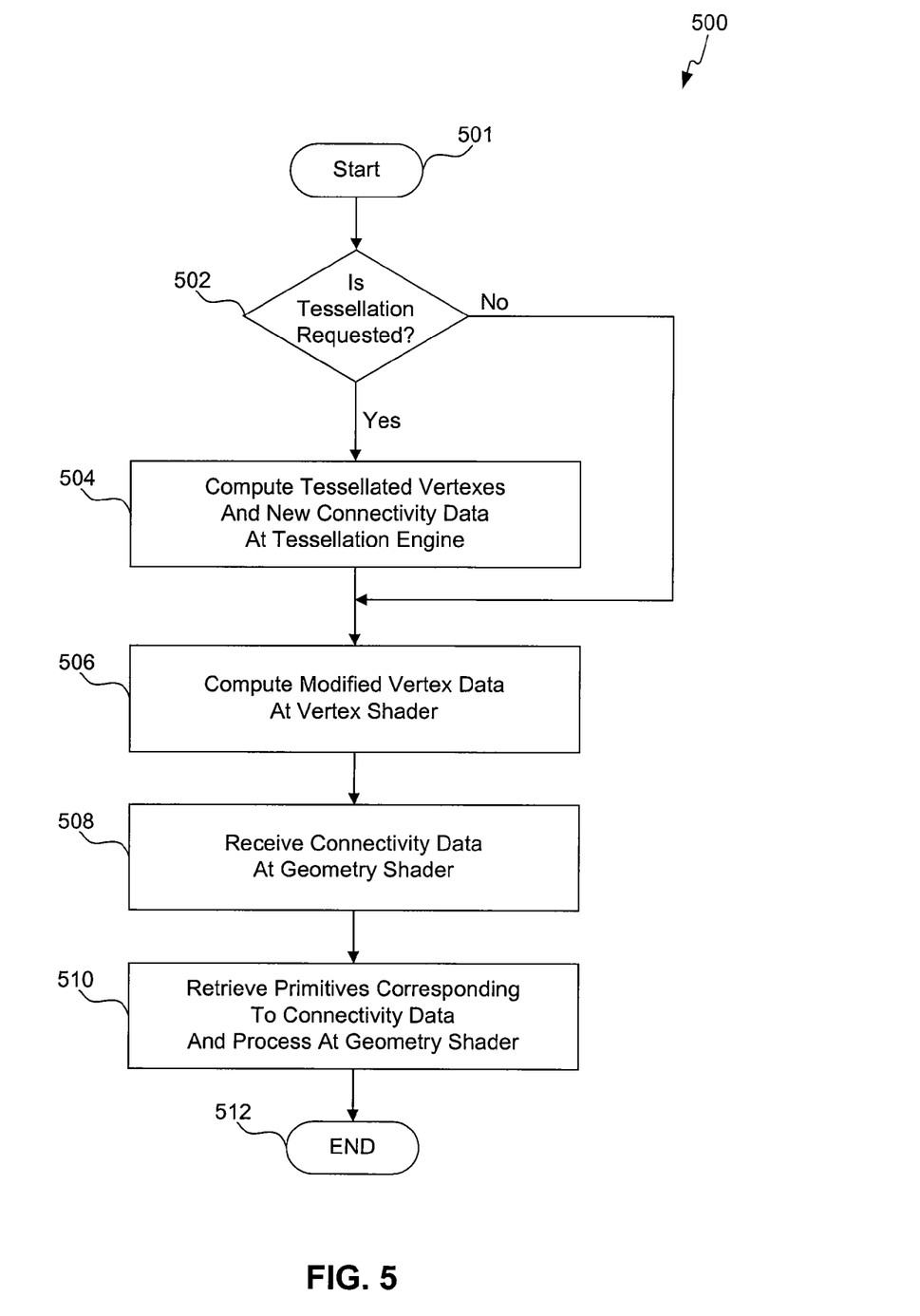
FIG. 5 is a flowchart depicting the steps by which a GPU pipeline implementation having a tessellation engine is operable to enhance processing by a geometry shader, in accordance with an embodiment of the present invention.

FIG. 5 is a flowchart 500 illustrating the steps by which the GPU pipeline 300 of FIG. 3 is operable to provide optimized tessellated graphics, in accordance with an embodiment of the present invention. The method begins at step 501 and proceeds to step 502 where it is determined whether tessellation has been requested.

In accordance with an embodiment of the present invention, tessellation is only applied when a certain threshold has been met. This threshold could be, for example, the distance of an object being rendered from a viewing plane, the curvature of the object, or other criteria. One skilled in the relevant arts will recognize that other thresholds exist for optimizing the complexity of a rendered object relative to the ability of a user of a graphics application to perceive the complexity. Moreover, the threshold is modified, in accordance with an embodiment of the present invention, based on considerations such as the computational ability of the particular GPU pipeline 300, the display area, and user preferences. If tessellation is not requested at step 502, the method proceeds at step 506 without performing tessellation.

At step 504, tessellation is performed in the tessellation engine 202, with the tessellation engine 202 computing tessellated vertices and generating new connectivity data defining connections between all vertices, both original and tessellated. At step 506, the vertex shader 203 computes modified vertex data, in accordance with an embodiment of the present invention. As previously disclosed, vertex shader 203 receives the original and the tessellated vertex set at step 402 of FIG. 4 from the tessellation engine 202, on which vertex shader 203 is operable to generated the computed vertex set at step 404. In accordance with an additional embodiment of the present invention, the computed vertex set is stored in evaluation shader 204.

The method proceeds to step 508, where the geometry shader 104 receives the connectivity data from tessellation engine 202. At step 510, the geometry shader 104 identifies the primitives corresponding to the connectivity data and retrieves the corresponding vertices. In accordance with an embodiment of the present invention, geometry shader 104 retrieves the vertices from evaluation shader 204, where they have been stored by vertex shader 203. Geometry shader 104 then performs primitive-level operations on the retrieved primitives, and the method ends at step 512.

Computer System Implementation

Figure 6:
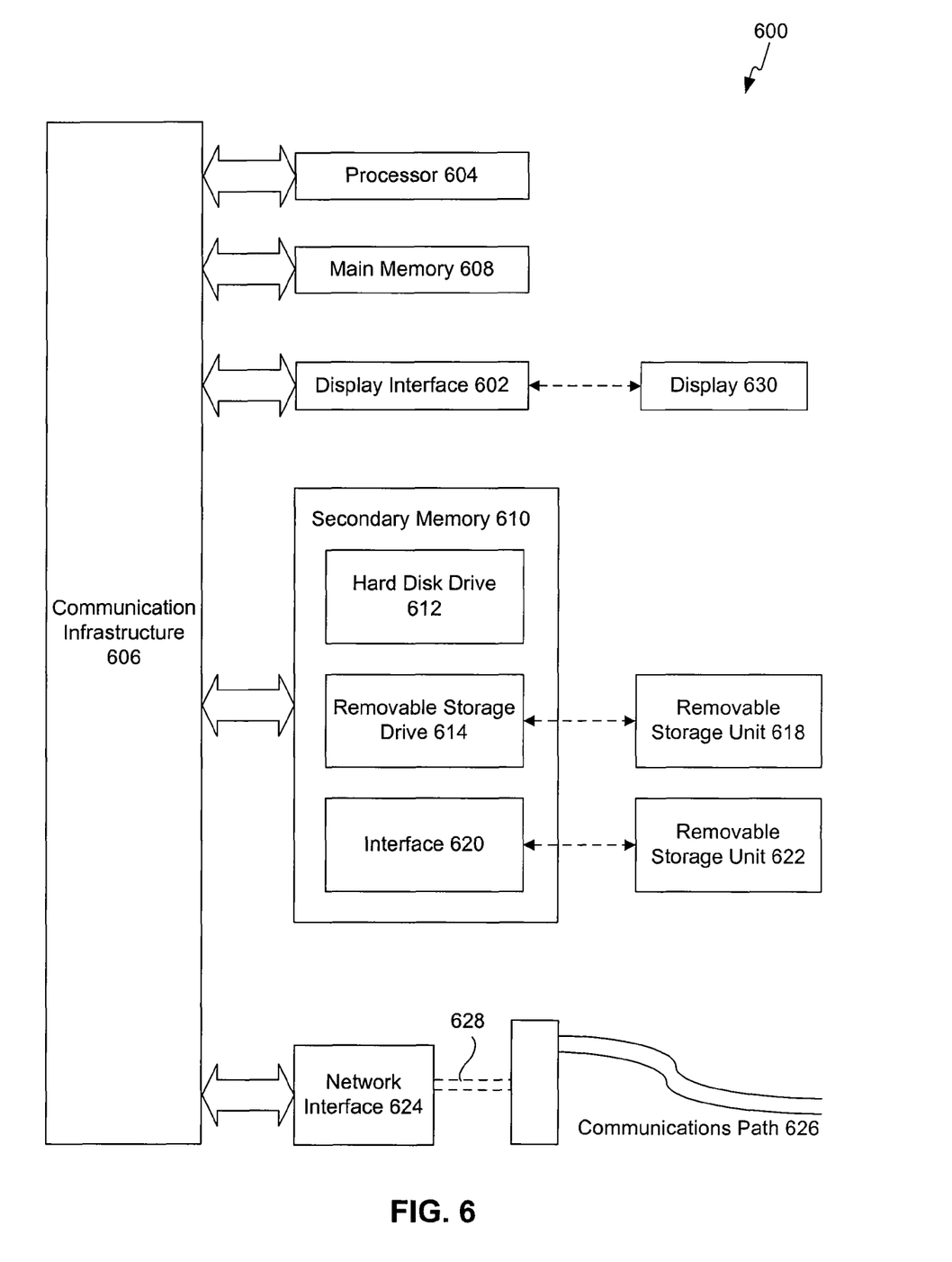
FIG. 6 depicts an example computer system in which embodiments of the present invention may be implemented.

Various aspects of the present invention can be implemented by software, firmware, hardware, or a combination thereof. FIG. 6 illustrates an example computer system 600 in which the present invention, or portions thereof, can be implemented as computer-readable code. For example, the methods illustrated by flowchart 500 of FIG. 5 can be implemented in system 600. Various embodiments of the invention are described in terms of this example computer system 600. After reading this description, it will become apparent to a person skilled in the relevant art how to implement the invention using other computer systems and/or computer architectures.

Computer system 600 includes one or more processors, such as processor 604. Processor 604 can be a special purpose or a general purpose processor. Processor 604 is connected to a communication infrastructure 606 (e.g., a bus or network).

Computer system 600 also includes a main memory 608, preferably random access memory (RAM), and can also include a secondary memory 610. Secondary memory 610 can include, for example, a hard disk drive 612, a removable storage drive 614, and/or a memory stick. Removable storage drive 614 can comprise a floppy disk drive, a magnetic tape drive, an optical disk drive, a flash memory, or the like. The removable storage drive 614 reads from and/or writes to a removable storage unit 618 in a well known manner. Removable storage unit 618 can comprise a floppy disk, magnetic tape, optical disk, etc. which is read by and written to by removable storage drive 614. As will be appreciated by persons skilled in the relevant art, removable storage unit 618 includes a computer-usable storage medium having stored therein computer software and/or data.

In alternative implementations, secondary memory 610 can include other similar means for allowing computer programs or other instructions to be loaded into computer system 600. Such means can include, for example, a removable storage unit 622 and an interface 620. Examples of such means can include a program cartridge and cartridge interface (such as those found in video game devices), a removable memory chip (e.g., EPROM or PROM) and associated socket, and other removable storage units 622 and interfaces 620 which allow software and data to be transferred from the removable storage unit 622 to computer system 600.

Computer system 600 can also include a communications interface 624. Communications interface 624 allows software and data to be transferred between computer system 600 and external devices. Communications interface 624 can include a modem, a network interface (such as an Ethernet card), a communications port, a PCMCIA slot and card, or the like. Software and data transferred via communications interface 624 are in the form of signals which can be electronic, electromagnetic, optical, or other signals capable of being received by communications interface 624. These signals are provided to communications interface 624 via a communications path 626. Communications path 626 carries signals and can be implemented using wire or cable, fiber optics, a phone line, a cellular phone link, a RF link or other communications channels.

In this document, the terms "computer program medium" and "computer-usable medium" are used to generally refer to media such as removable storage unit 618, removable storage unit 622, and a hard disk installed in hard disk drive 612. Signals carried over communications path 626 can also embody the logic described herein. Computer program medium and computer-usable medium can also refer to memories, such as main memory 608 and secondary memory 610, which can be memory semiconductors (e.g., DRAMs, etc.). These computer program products are means for providing software to computer system 600.

Computer programs (also called computer control logic or data and/or instructions) are stored in main memory 608 and/or secondary memory 610. Computer programs can also be received via communications interface 624. Such computer programs, when executed, enable computer system 600 to implement the present invention as discussed herein. In particular, the computer programs, when executed, enable processor 604 to implement the processes of the present invention, such as the steps in the methods illustrated by flowchart 500 of FIG. 5, discussed above. Accordingly, such computer programs represent controllers of the computer system 600. Where the invention is implemented using software, the software can be stored in a computer program product and loaded into computer system 600 using removable storage drive 614, interface 620, hard drive 612 or communications interface 624.

The invention is also directed to computer program products comprising software stored on any computer-usable medium. Such software, when executed in one or more data processing device, causes a data processing device(s) to operate as described herein or, as noted above, allows for the synthesis and/or manufacture of computing devices (e.g., ASICs, or processors) to perform embodiments of the present invention described herein. Embodiments of the invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMs, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

Application-Level Implementation

Figure 7:
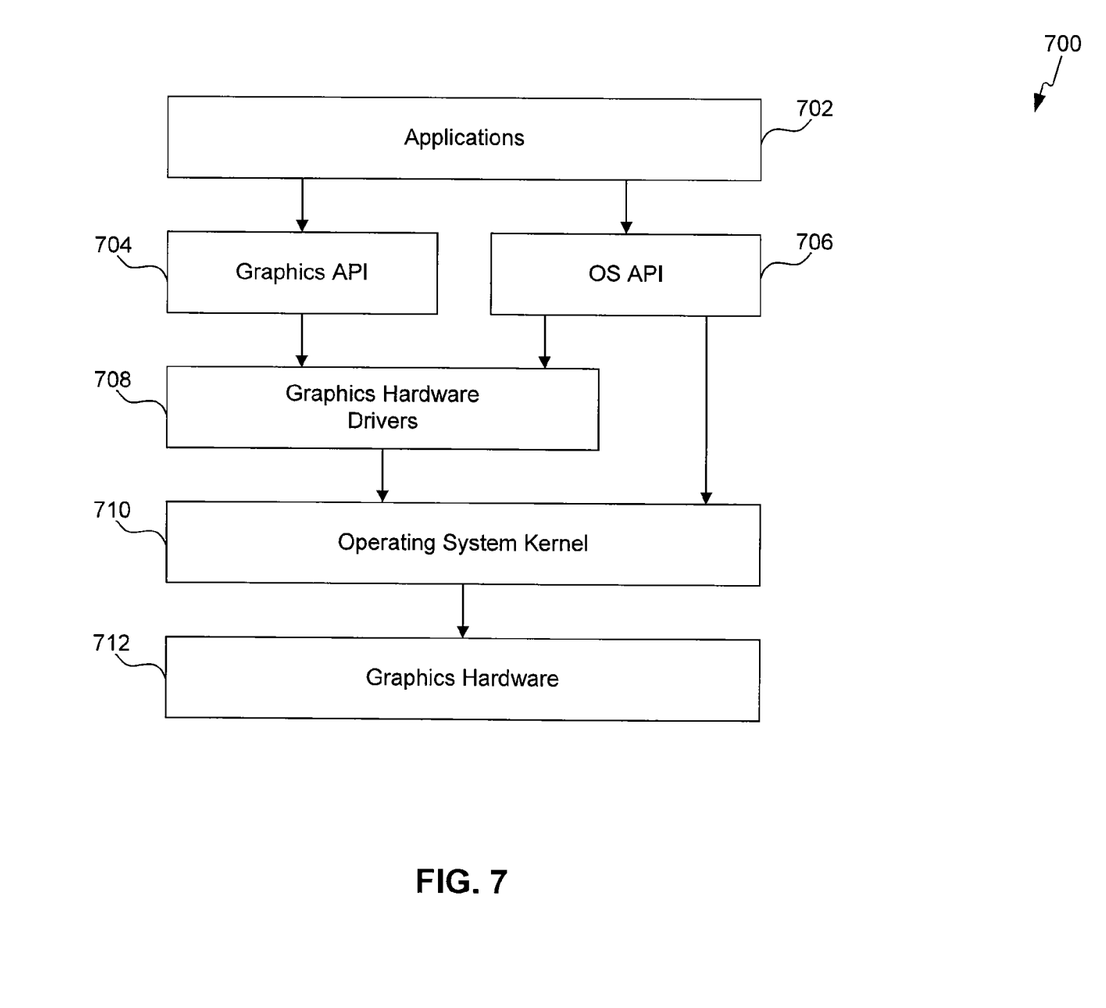
FIG. 7 is an exemplary illustration of interface layers in a computer system in which embodiments of the present invention may be implemented.

FIG. 7 is a diagram 700 illustrating various layers of abstraction by which graphics applications 702 are operable to interact with graphics hardware disclosed herein, in accordance with an embodiment of the present invention. Applications 702 are able to send messages to a number of application programming interfaces ("APIs"), including graphics APIs 704 and operating system ("OS") APIs 706. Graphics APIs 704 include, for example, Microsoft DirectX 10 developed by Microsoft Corporation of Redmond, Wash., or the Open Graphics Library ("OpenGL") developed by Silicon Graphics, Inc. of Sunnyvale, Calif.

The various APIs may further interact with an abstraction layer commonly provided by a graphics hardware manufacturer to interact with the specific graphics hardware, namely graphics hardware drivers 708. The various levels of communication are received by the operating system kernel 710, which then sends the appropriate messages to graphics hardware 712.

In accordance with an embodiment of the present invention, the aforementioned graphics pipeline 300 of FIG. 3 is implemented within graphics hardware 712. In accordance with an additional embodiment of the present invention, graphics hardware drivers 708 and graphics API 704 are optimized to use the tessellation features of graphics pipeline 300.

Conclusion

While various embodiments of the present invention have been described above, it should be understood that they have been presented by way of example only, and not limitation. It will be understood by those skilled in the relevant art that various changes in form and details can be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for providing tessellated primitive data to a geometry shader, the method comprising:
computing a new set of tessellated vertices and a new set of connectivity information in a tessellation engine based on an original set of vertices and an original set of connectivity information;
transmitting, via a first transmission, the original set of vertices and the new set of tessellated vertices from the tessellation engine to a vertex shader;
transmitting, via a second transmission, the new set of connectivity information for the original set of vertices and the new set of tessellated vertices from the tessellation engine to the geometry shader without going through the vertex shader, wherein the second transmission is separate from the first transmission;
generating modified vertex data in the vertex shader based on the original set of vertices and the new set of tessellated vertices;
transmitting, from the vertex shader to the geometry shader, a subset of the modified vertex data based on the new set of connectivity information; and
processing primitives defined by the subset of the modified vertex data.

2. The method of claim 1, further comprising:
disabling use of the tessellation engine to process surface data output when the original set of vertices does not meet a threshold.

3. The method of claim 2, wherein the threshold is defined by a distance from a viewing plane.

4. The method of claim 3, wherein the threshold is adjusted based on the size of a viewing window.

5. The method of claim 1, further comprising:
storing the modified vertex data in an evaluation shader in the vertex shader.

6. The method of claim 5, wherein the transmitting from the vertex shader to the geometry shader comprises:
transmitting the subset of the modified vertex data from the evaluation shader.

7. The method of claim 1, wherein the original set and the new set of connectivity information comprise information identifying connections between the original set of vertices and the new set of tessellated vertices, respectively.

8. A graphics processing unit for providing tessellated primitive data to a geometry shader, the graphics processing unit comprising:
a tessellation engine configured to:
compute a new set of tessellated vertices and a new set of connectivity information based on an original set of vertices and an original set of connectivity information,
transmit, via a first transmission, the original set of vertices and the new set of tessellated vertices to a vertex shader, and
transmit, via a second transmission, the new set of connectivity information for the original set of vertices and the new set of tessellated vertices to the geometry shader without going through the vertex shader, wherein the second transmission is separate from the first transmission;
the vertex shader configured to generate modified vertex data based on the original set of vertices and the new set of tessellated vertices received from the tessellation engine; and
the geometry shader configured to receive the new set of tessellated vertices from the vertex shader, retrieve from the vertex shader a subset of the modified vertex data based on the new set of connectivity data, and process primitives defined by the subset of the modified vertex data.

9. The graphics processing unit of claim 8, wherein the tessellation engine is disabled when the original set of vertices does not meet a threshold.

10. The graphics processing unit of claim 9, wherein the threshold is defined by a distance from a viewing plane.

11. The graphics processing unit of claim 10, wherein the threshold is adjusted based on the size of a viewing window.

12. The graphics processing unit of claim 8, wherein the vertex shader is configured to store the modified vertex data in an evaluation shader.

13. The graphics processing unit of claim 12, wherein the geometry shader is configured to retrieve the subset of the modified vertex data from the evaluation shader.

14. The graphics processing unit of claim 8, wherein the original set and the new set of connectivity information comprise information identifying connections between the original set of vertices and the new set of tessellated vertices, respectively.

15. A computer-readable storage device having computer program logic recorded thereon, execution of which, by a computing device, causes the computing device to perform operations, comprising:

compute a new set of tessellated vertices and a new set of connectivity information in a tessellation engine based on an original set of vertices and an original set of connectivity information;

transmit, via a first transmission, the original set of vertices and the new set of tessellated vertices from the tessellation engine to a vertex shader;

transmit, via a second transmission, the new set of connectivity information for the original set of vertices and the new set of tessellated vertices from the tessellation engine to the geometry shader without going through the vertex shader, wherein the second transmission is separate from the first transmission;

generate modified vertex data in the vertex shader based on the original set of vertices and the new set of tessellated vertices;

transmit, from the vertex shader to the geometry shader, a subset of the modified vertex data based on the new set of connectivity information; and process primitives defined by the subset of the modified vertex data.

16. The computer-readable storage device of claim 15, further comprising:

disable use of the tessellation engine to process surface data output when the original set of vertices does not meet a threshold.

17. The computer-readable storage device of claim 16, wherein the threshold is defined by a distance from a viewing plane.

18. The computer-readable storage device of claim 17, wherein the threshold is adjusted based on the size of a viewing window.

19. The computer-readable storage device of claim 15, further comprising:

store the modified vertex data in an evaluation shader in the vertex shader.

20. The computer-readable storage device of claim 19, further comprising: retrieve a subset of the modified vertex data from the evaluation shader.

21. The computer-readable storage device of claim 15, wherein the original set and the new set of connectivity information comprise information identifying connections between the original set of vertices and the new set of tessellated vertices, respectively.

* * * * *